United States Patent [19]
Lee

[11] Patent Number: 6,081,079
[45] Date of Patent: Jun. 27, 2000

[54] HORIZONTAL DEFLECTION DRIVE CIRCUIT USING A PLURALITY OF FETS

[75] Inventor: Su-Chan Lee, Kyungki-do, Rep. of Korea

[73] Assignee: SamSung Electronics Co., Ltd., Kyungki-do, Rep. of Korea

[21] Appl. No.: 09/085,225

[22] Filed: May 27, 1998

[30] Foreign Application Priority Data

May 27, 1997 [KR] Rep. of Korea ...................... 97-20948

[51] Int. Cl.[7] .............................. H01J 29/70; G09G 1/04
[52] U.S. Cl. ........................... 315/408; 315/369; 315/399
[58] Field of Search .................................... 315/408, 399, 315/369, 411

[56] References Cited

U.S. PATENT DOCUMENTS

| | | | |
|---|---|---|---|
| 5,177,411 | 1/1993 | Kii | 315/368.18 |
| 5,796,218 | 8/1998 | Kwon et al. | 315/411 |
| 5,808,426 | 9/1998 | Lee | 315/408 |

*Primary Examiner*—Edward P. Westin
*Assistant Examiner*—John Patti
*Attorney, Agent, or Firm*—Robert E. Bushnell, Esq.

[57] ABSTRACT

A horizontal deflection drive circuit using a plurality of FETs is provided, which includes a base drive current supply for receiving an oscillation pulse in a low level generated by an oscillation element, to perform switching operation, a P-channel FET for receiving the oscillation pulse in a low level generated by the oscillation element, and receiving current from the base drive current supply, to perform switching operation, an N-channel FET for receiving an oscillation pulse in a high level generated by the oscillation element, to perform switching operation, and a drive transformer for inducing current supplied from a deflection current supply according to the switching operations of the P-channel FET and N-channel FET, the P-channel FET being switched by the current supplied from the base drive current supply. Stable base drive is provided to the horizontal output transistor, to stabilize the unstable operation of the display device, due to switching loss and storage loss according to horizontal frequency variation.

5 Claims, 4 Drawing Sheets

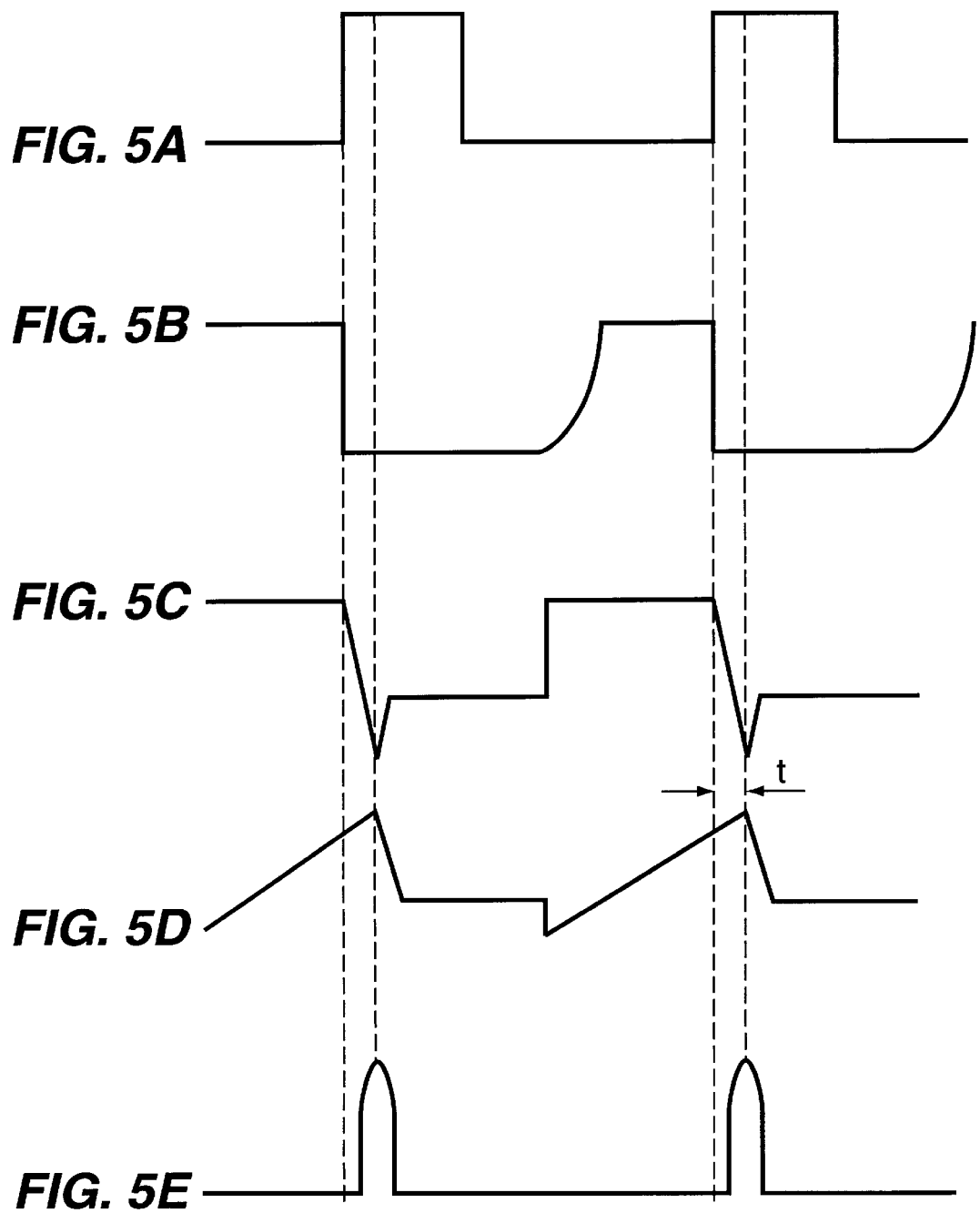

HORIZONTAL DEFLECTION DRIVE CIRCUIT USING A PLURALITY OF FETS

CLAIM OF PRIORITY

This application makes reference to, incorporates the same herein, and claims all benefits accruing under 35 U.S.C. §119 from my applications entitled HORIZONTAL DEFLECTION DRIVE CIRCUIT USING A PLURALITY OF FETS filed in the Korean Industrial Property Office on May 27, 1997 and there duly assigned Serial No.P97-20948 by that Office.

BACKGROUND OF THE INVENTION

1. Field of the Invention

The present invention relates to a horizontal deflection drive circuit using a plurality of field effect transistors (FETs), specifically, to a horizontal deflection drive circuit which employs a plurality of FETs having rapid operation speeds, to correct unbalance in low frequency drive condition and high frequency drive condition.

2. Discussion of Related Art

A display monitor generally displays a video signal generated by a host computer or personal computer as a visual image. In the display monitor, electron beam is emitted from the electron gun of a cathode ray tube, to be impacted on the fluorescent screen by deflection operation performed by a deflection coil, thereby displaying the video signal. A conventional display monitor which displays video signals through the above operation is described below with reference to the attached drawings.

FIG. 1 is a block diagram showing the inner circuit of the conventional display device. Referring to FIG. 1, a host computer 100 includes a CPU 110 for receiving and processing a keyboard signal, and generating data according to the processing result, and a video card 120 for receiving the data from CPU 110, processing it to generate a video signal (R,G,B), and outputting a horizontal synchronous signal H-SYNC and vertical synchronous signal V-SYNC for synchronizing the video signal (R,G,B). A display device 200, which receives the video signal, horizontal and vertical synchronous signals HSYNC and V-SYNC output from video card 120 included in host computer 100, comprises a microcomputer 210 for receiving the horizontal and vertical synchronous signals to judge resolution, a control button 220 for generating a picture control signal for controlling a display monitor picture and outputting it, a horizontal and vertical output circuit 230 for receiving the monitor picture control signal from microcomputer 210 and a reference oscillation signal, to synchronize raster, a video circuit 240 for receiving and amplifying the video signal (R,G,B) from video card 120, and displaying it, and a power circuit 250 for supplying drive voltage to microcomputer 210, horizontal and vertical output circuit 230 and video circuit 240.

Inner blocks of display device 200 are described below in more detail. The horizontal and vertical synchronous signals H-SYNC and V-SYNC output from video card 120 of PC 100 are applied to microcomputer 210 which stores various picture control data. Microcomputer 210 outputs an image control signal for controlling an image displayed on the monitor picture and the reference oscillation signal according to the picture control signal applied from control button 220. The image control signal and reference oscillation signal are sent from microcomputer 210 to a horizontal and vertical oscillation signals processor 230-1 which applies a vertical pulse for controlling the switching speed of ON/OFF operation of a sawtooth generating circuit to a vertical drive circuit 230-2 according to the horizontal and vertical synchronous signals supplied from video card 120.

Vertical drive circuit 230-2, which receives the vertical pulse, generally employs an one-stage vertical amplifying type, or emitter follower type in which a signal is input to the base of transistor and output from its emitter. Accordingly, it improves linearity rather than gain. A vertical output circuit 230-3 which receives a current signal output from vertical drive circuit 230-2 generates sawtooth wave current which flows through a V-DY 230-4, corresponding to a vertical synchronous pulse, determining a vertical scanning cycle. Horizontal and vertical oscillation signals processor 230-1 outputs a horizontal oscillation signal to a horizonal drive circuit 230-5 which supplies current sufficient for turning on/off a horizonal output circuit 230-6. Horizontal drive circuit 230-5 is divided into an in-phase (the same polarity) mode in which the output port is turned on when the drive port is turned on, and reverse phase (reverse polarity) mode, being currently widely used, in which the output port is turned off when the drive port is turned on. Horizontal output circuit 230-6, which has received current from horizontal drive circuit 230-5 having the above characteristics, generates sawtooth wave current and sends it to an H-DY 230-7. This sawtooth wave current determines a horizontal scanning cycle.

To supply a stable DC voltage to the anode of a cathode ray tube (CRT) 240-3, a flyback collector according to a flyback transformer (FBT) 230-9 is employed and harmonics according to leakage inductance and distributed capacitance of high voltage circuit 230-8 are used, to generate high voltage and apply it to anode port 240-4-1 of CRT 240-4, even though the collector pulse is small. Anode port 140-4-1 creates high voltage on the anode surface of CRT 240-4 according to the applied high voltage.

Meanwhile, video signal processor 240 receives OSD data in accordance with the picture control from microcomputer 210, to output an OSD gain signal. The OSD gain signal output from OSD 240-1 and the video signal (R,G,B) applied from video card 120 are sent to a video pre-amplifier 240-2 which amplifies a low-level video signal (R,G,B) with a low voltage amplifier, maintaining a specific level of voltage of the signal. For example, a signal of below 1 Vpp (peak to peak voltage) is amplified to 4–6 Vpp. A video output amplifier 240-3 amplifies the pre-amplified signal of 4–6 Vpp to 40–60 Vpp, supplying energy to each pixel of the display. The video signal amplified by video output amplifier 240-3 is sent to the cathode of CRT 240-4, to be converted into electron beam, displaying an image according to the video signal on the picture of the monitor.

In case of selection of OSD, the OSD is selected by video pre-amplifier 240-2, amplified to a predetermined level, and finally amplified by video output amplifier 240-3, displaying the OSD data on the picture of CRT 240-4. The OSD data displayed on CRT 240-4 provides a user of display device 200 with functions of the display or information on it. As described above, the video signal (R,G,B) and OSD gain signal amplified by video main amplifier 240-3 are displayed as a visual image on the display picture, their luminances being controlled by the high voltage formed on the anode surface of CRT 240-4.

Power circuit 250, which supplies drive voltage for displaying the video signal on the display device picture, receives alternating current (AC) through an AC input terminal 250-1 to which common AC is applied. A degaussing coil 250-2 receives the AC through AC input terminal 250-1, and recovers colors spread caused due to terrestrial magnetism or external conditions to the original colors. For example, when AC is applied to degaussing coil 250-2 for 2 to 9 seconds, DC component of magnetism formed on a shadow mask in display device 200 is dispersed. This recovers the color spread caused by inexact deflection of electron beam to fluorescent material due to the DC component of magnetism.

DC rectified by a rectifier 250-3 is applied to a switching transistor 250-4. On application of DC, switching transistor 250-4 performs switching operation to supply various drive voltages required for inner blocks of display device 200 through a voltage regulator 250-5. Here, a pulse width modulation (PWM) IC 250-6 controls ON/OFF operations of switching transistor 250-4, to stabilize output voltage. Meantime, microcomputer 210 executes display power management signalling (DPMS) mode based on VESA standard such as power off mode and suspend mode according to the detection of the horizontal and vertical synchronous signals, reducing the power consumed in display device 200.

Horizontal drive circuit 230-5 and horizontal output circuit 230-6 of the conventional display monitor 200 are explained below in more detail. FIG. 2 is a block diagram of the horizontal drive circuit and horizontal output circuit of FIG. 1. Referring to FIG. 2, a horizontal oscillation circuit 230-1a of horizontal and vertical oscillation circuit 230-1 receives the reference oscillation signal from microcomputer 210, and generates a horizontal oscillation pulse according to the cycle of the reference oscillation signal. The horizontal oscillation pulse is applied to horizontal base drive circuit 230-5 which generates current sufficient for turning on/off a horizontal deflection transistor 230-6b of horizontal deflection circuit 230-6, outputting a horizontal drive pulse.

DC supplied fro voltage regulator 250-5 is applied to a deflection current supply circuit 250-6a, generating deflection current. This deflection current is supplied to a horizontal deflection transistor 230-6b of horizontal deflection circuit 230-6. Horizontal deflection transistor 230-6b to which the deflection current from deflection current supply circuit 230-6a is applied receives the horizontal drive pulse from horizontal base drive circuit 230-5, to be turned on or turned off. Depending on turning of/off of horizontal deflection transistor 230-6b, horizontal deflection sawtooth wave current generates at horizontal deflection yoke H-DY, to deflect the video signal applied to CRT 240-4. That is, the electron beam based on the video signal (R,G,B) is deflected according to the horizontal sawtooth wave current generated by horizonal deflection yoke 230-7, to display the video signal as a visual image on the CRT picture.

This conventional horizontal base drive circuit 230-5 is divided into a multi-synchronizing mode and single synchronizing mode. With the horizontal base drive circuit using the multi-synchronizing mode, it should satisfy each horizontal deflection in accordance with each of the multiple synchronizing modes using one of FET and bipolar transistor. Accordingly, the horizontal base drive circuit requires a large number of components in order to provide base drive suitable for each horizontal frequency in the multiple synchronizing modes. Furthermore, when low frequency drive condition does not correspond with high frequency drive condition in the single synchronizing mode, there is switching loss in the FET or bipolar transistor of the horizontal base drive circuit. Moreover, the discordance in the drive conditions generates heat in the FET or bipolar transistor, and thus a heatsink for emitting the heat becomes larger.

SUMMARY OF THE INVENTION

An object of the present invention is to provide a horizontal deflection drive circuit using a plurality of FETs, in which a horizontal base drive circuit employs a plurality of FETs, to correct unbalance in low frequency drive condition and high frequency drive condition, thereby minimizing the switching loss and generation of heat.

To accomplish the object of the present invention, there is provided a horizontal deflection drive circuit using a plurality of FETs, including: a base drive current supply for receiving an oscillation pulse in a low level generated by an oscillation element, to perform switching operation; a P-channel FET for receiving the oscillation pulse in a low level generated by the oscillation element, and receiving current from the base drive current supply, to perform switching operation; an N-channel FET for receiving an oscillation pulse in a high level generated by the oscillation element, to perform switching operation; and a drive transformer for inducing current supplied from a deflection current supply according to the switching operations of the P-channel FET and N-channel FET, the P-channel FET performing switching operation by receiving the current supplied from the base drive current supply.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIGS. 5A–5E are waveforms of input and output signals of each circuit block shown in FIG. 4.

DETAILED DESCRIPTION OF PREFERRED EMBODIMENT

Figure 1:
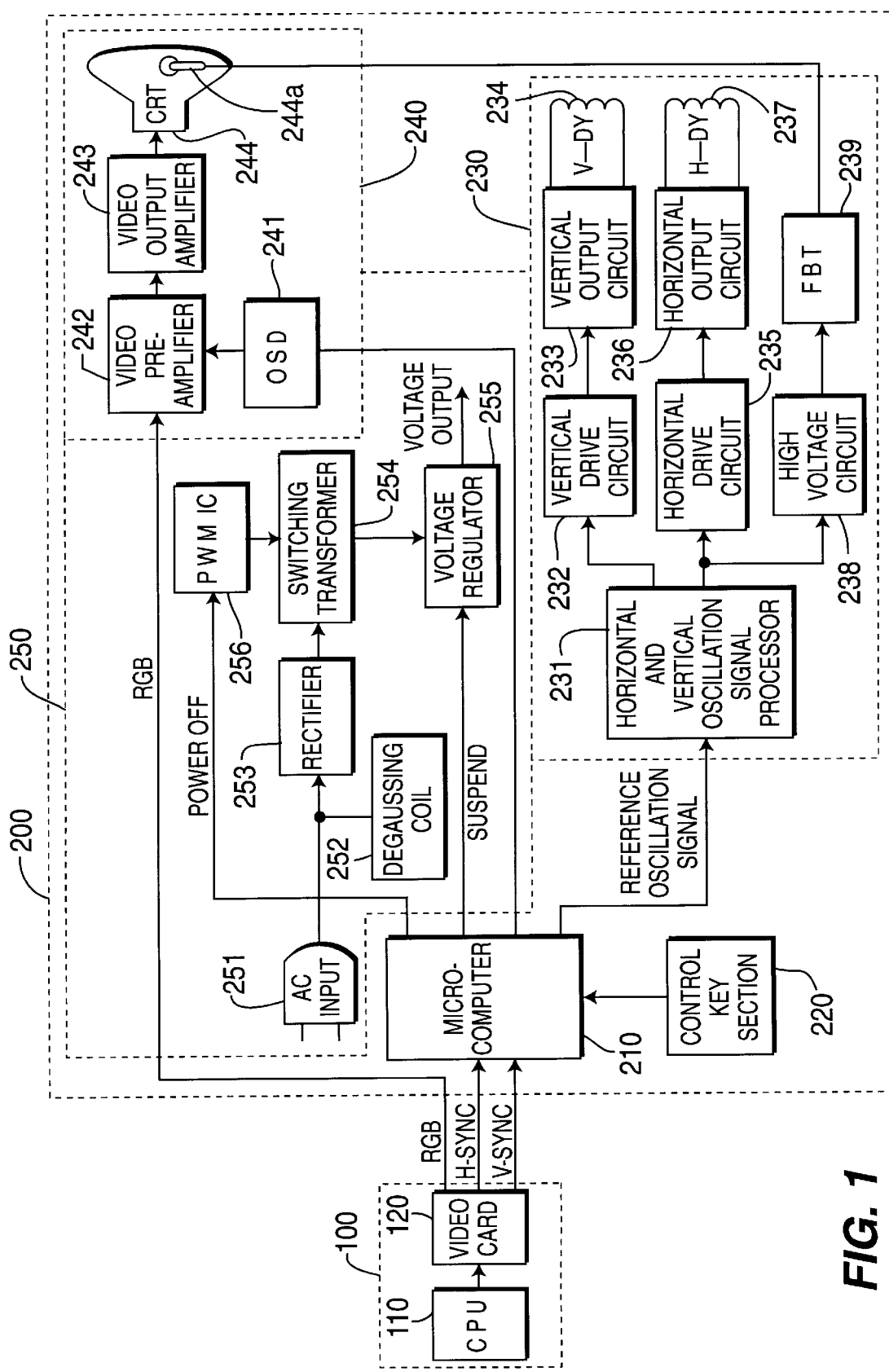
FIG. 1 is a block diagram showing the inner circuit of a conventional display monitor.
Figure 2:
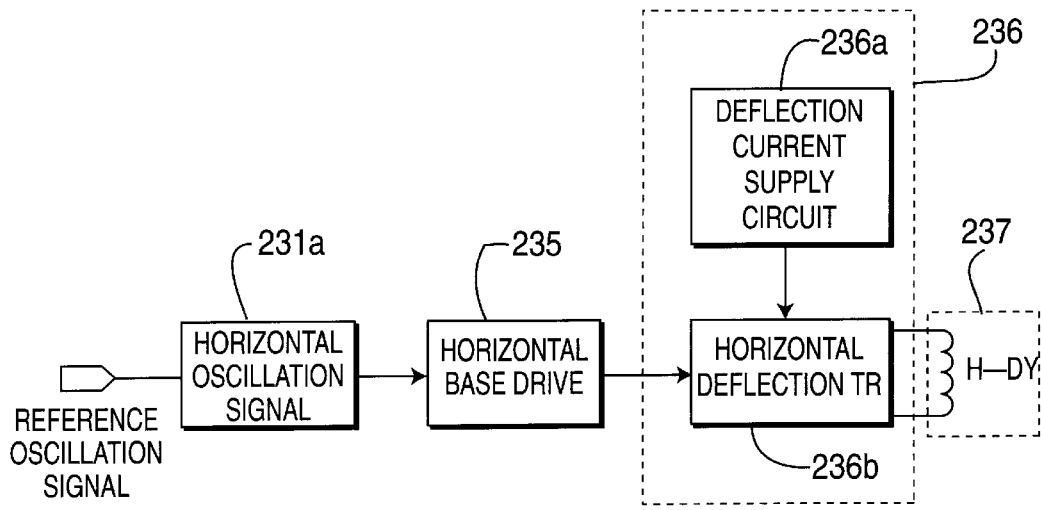
FIG. 2 is a block diagram showing the horizontal drive circuit and horizontal output circuit of FIG. 1.
Figure 3:
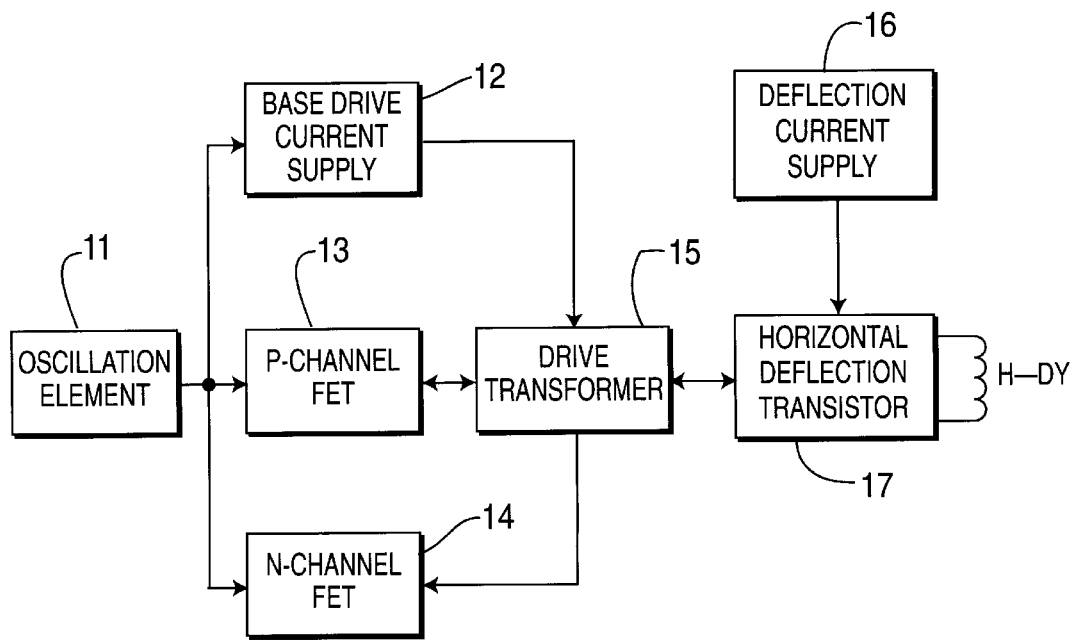
FIG. 3 is a block diagram of a horizontal drive circuit and horizontal output circuit according to the present invention.

FIG. 3 is a block diagram of horizontal drive and horizontal output circuits according to the present invention. Referring to FIG. 3, the horizontal drive and horizontal output circuits include an oscillation element 11 for generating an oscillation pulse in a predetermined cycle, a base drive current supply 12 for receiving an oscillation pulse in a low level from oscillation element 11, to perform switching operation, a P-channel FET 13 for receiving the oscillation pulse in a low level from oscillation element 11 and receiving current from base drive current supply 12 to perform switching operation, an N-channel FET 14 for receiving an oscillation pulse in a high level from oscillation element 11 to carry out switching operation, a drive transformer 15 for inducing current supplied from a deflection current supply 16 according to the switching operations of P-channel FET 13 and N-channel FET 14, and a horizontal output transistor 17 which is switched by drive transformer 15, to generate horizontal sawtooth wave current to a horizontal deflection yoke H-DY.

Figure 4:
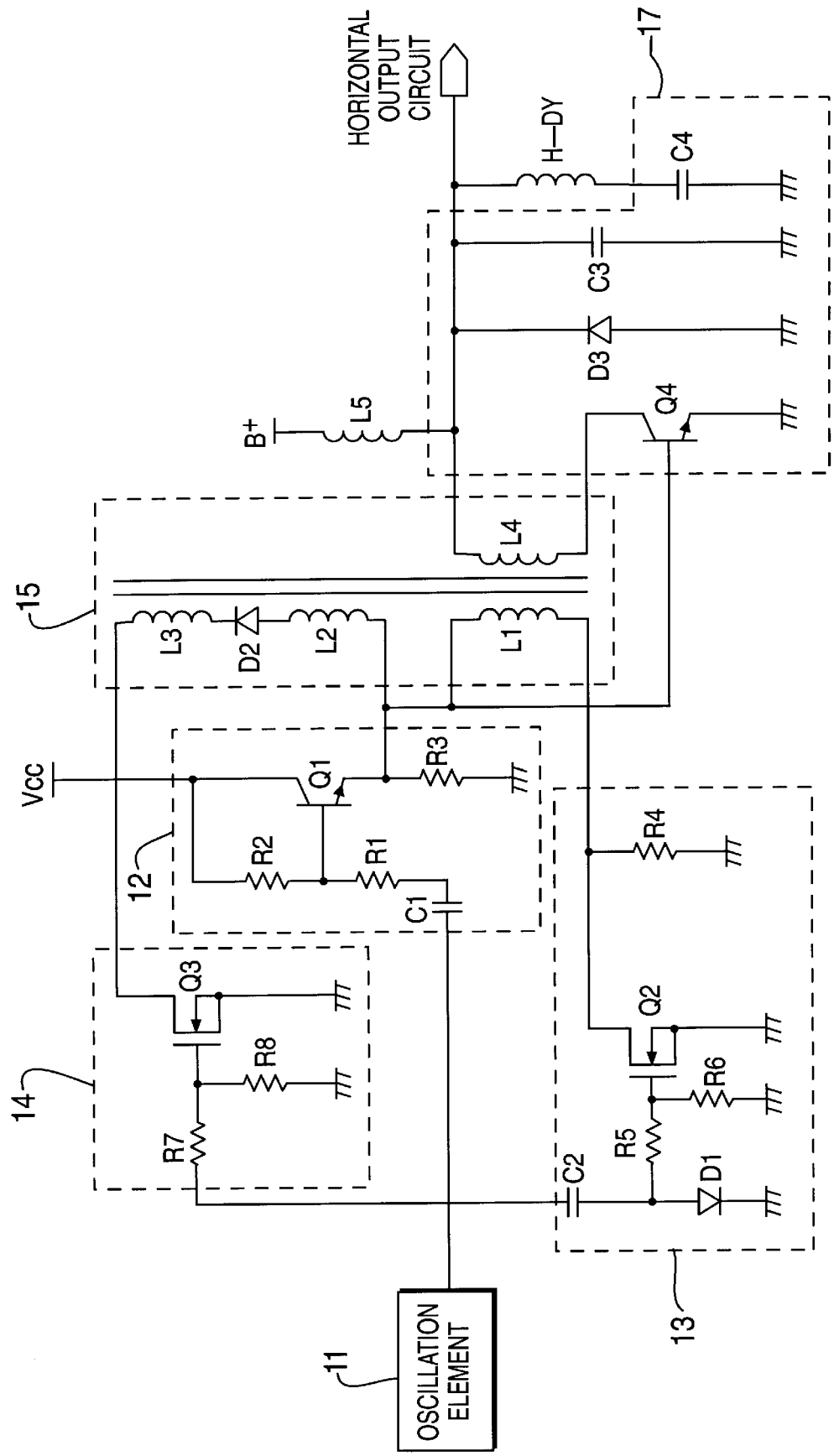
FIG. 4 is a circuit diagram of the circuits shown in FIG. 3.

FIG. 4 is a circuit diagram of the circuits shown in FIG. 3. Referring to FIG. 4, base drive current supply 12 comprises a capacitor C1 for coupling the oscillation pulse in a low level generated by oscillation element 11, resistors R1 and R2 for voltage-dividing the oscillation pulse in a low level coupled by capacitor C1, and a transistor Q1 which receives the oscillation pulse in a low level, voltage-divided by resistors R1 and R2, to perform switching, to be thereby turned on. P-channel FET 13 which receives the current from base drive current supply 12 including resistors R1 and R2 and transistor Q1 comprises a capacitor C2 for coupling the oscillation pulse in a low level generated by oscillation element 11, resistors R5 and R6 for voltage-dividing the oscillation pulse in a low level coupled by capacitor C2, and a FET Q2 which receives the oscillation pulse voltage-divided by resistors R5 and R6 and current output when transistor Q1 of base drive current supply 12 is turned on, to perform switching operation, to be thereby turned on.

N-channel FET 14, which receives the oscillation pulse-in a high level generated by oscillation element 11 to carry out switching operation, to be thereby turned on, consists of resistors R7 and R8 for receiving the oscillation pulse in a high level generated by oscillation element 11 and voltage-dividing it, and a FET Q3 which receives the oscillation pulse in a high level voltage-divided by resistors R7 and R8 to be switched, thereby being turned on. Drive transformer 15 which induces energy according to the switching operations of P-channel FET 13 and N-channel FET 14 includes a coil L4 to which deflection current is supplied, a coil L1 for receiving the energy induced by coil L4 when FET Q2 of P-channel FET 13 is turned on, and coils L2 and L3 for receiving the energy induced by coil L1 when FET Q3 of N-channel FET 14 is turned on.

Horizontal deflection output transistor 17, which generates horizontal sawtooth wave current depending on whether P-channel FET 13 and N-channel FET 14, which are switched by the energy induction of drive transformer 15 including coils L1, L2, L3 and L4, are turned on or not, comprises a transistor Q4 which receives a current signal according to the switching of P-channel FET 13 and N-channel FET 14, to perform switching operation, a capacitor C3 which is charged or discharged depending on whether switching transistor Q4 is switched or not, and a damping diode D3 which performs damping operation according to charging/discharging of capacitor C3.

The operation of the horizontal deflection drive circuit of the invention is explained below. When the oscillation pulse in a low level is generated by oscillation element 11, this oscillation pulse is applied to base drive current supply 12 which couples it through capacitor C1 and applies it to the base of transistor Q1. Here, DC voltage Vcc supplied to the collector of transistor Q1 forms a fixed bias through resistor R2. DC voltage Vcc supplied through resistor R2 is divided by resistor R1, and overlapped with the oscillation pulse in a low level applied through capacitor C1, to be applied to the base of transistor Q1. Then, transistor Q1 is switched to be turned on. Here, resistor R3 serves as an emitter load.

When transistor Q1 is turned on, its output current is supplied to the drain of FET Q2 through coil L1 of drive transformer 15 and resistor R4 of P-channel FET 13. FET Q2 to which the current output from the emitter of transistor Q1 is applied through its drain receives the oscillation pulse in a low level generated by oscillation element 11 to its gate. The oscillation pulse in a low level applied to the gate of FET Q2 is coupled by capacitor C2, and voltage-divided by resistors R5 and R6. Noise generated in the oscillation pulse in a low level is removed by diode D1.

FET Q2 receives the oscillation pulse in a low level to its gate and receives the current to its drain, to be switched, thereby being turned on. Simultaneously, energy is induced to coil L1 according to coil L4 of drive transformer 15. By doing so, a drive pulse in a high level is applied to the base of transistor Q4 of horizontal deflection transistor 17. On reception of the drive pulse in a high level, horizontal deflection transistor 17 is switched to be turned on. That is, transistor Q4 is turned on using the deflection current itself.

When transistor Q4 of horizontal output transistor 17 is turned on, deflection current $B^+$ supplied from deflection current supply 16 flows through coil L5 to the collector of transistor Q4. According to this, the collector current increases in proportion to time due to large inductance of horizontal deflection yoke H-DY. Here, the current flows to capacitor C3, to charge it. Meanwhile, when the oscillation pulse in a high level is generated by oscillation element 11, it is applied to N-channel FET 14. N-channel FET 14 voltage-divides the applied oscillation pulse in a high level through resistors R7 and R8, and applies it to the gate of FET Q3. Current induced to coil L3 according to current which flows through coil L4 of drive transformer 15 is applied to the drain of FET Q3 whose gate receives the oscillation pulse in a high level. That is, FET Q3 is switched by receiving the oscillation pulse in a high level to its gate and receiving the current which flows through coil L3 according to the induction operation of drive transformer 15 to its drain, to be thereby turned on.

The energy induced by coil L4 through which the deflection current flows due to turning on of FET Q3 is induced to coils L2 and L3. The current induced to coils L2 and L3 of drive transformer 15 flows from the drain of FET Q3 to its source. At this point, transistor Q1 of base drive current supply 12 and FET Q2 of P-channel FET 13 are turned off. Accordingly, the deflection current which flows through coil L4 of drive transformer 15 flows to FET Q3 of N-channel FET 14, and thus current in a low level is applied to the base of transistor Q4 of horizontal deflection transistor 15, turning off it.

Since the current in a low level flows to the base of transistor Q4 of horizontal deflection transistor 17, high negative voltage is created at the collector of transistor Q4 due to resonance of inductance of horizontal deflection yoke H-DY of horizontal deflection transistor 17 and parallel capacitance of capacitor C3. This makes damping diode D3 conductive, to allow the sawtooth wave current to flow to horizontal deflection yoke H-DY. A coil L5 is used as a choke coil, and capacitor C4 corrects the horizontal sawtooth wave current which flows through horizontal deflection yoke H-DY. The horizontal output voltage generated according to the switching of transistor Q4 is used as a source for high voltage.

The waveform at the collector of transistor Q1 of base drive current supply 12 and waveforms at the input and output ports of transistor Q4 of horizontal deflection transistor 17 are explained below with reference to the attached drawings. FIGS. 5A to 5E show waveforms of input and output signals of each circuit block shown in FIG. 4. FIG. 5A shows the waveform of the oscillation pulse generated by oscillation element 11, and FIG. 5B shows the waveform of current signal transmitted through the collector of transistor Q1 according to switching of transistor Q1 of the base drive current supply. The waveform of FIG. 5B is created according to rising edge trigger in the oscillation pulse of FIG. 5A. FIG. 5C is the waveform of current signal applied to the base of transistor Q4 of the horizontal output transistor. This waveform is created according to falling edge trigger of the oscillation pulse generated by oscillation element 11. The base current of transistor Q4 starts to drop according to the falling edge trigger of the waveform of FIG. 5B. With the drop in the base current of transistor Q4, bias due to the deflection current is used for allowing the current to flow to the collector and base of transistor Q4 continuously, minimizing storage time (t). When the current is applied to the base of transistor Q4 with minimized storage time (t), the collector current of transistor Q4 of horizontal deflection output transistor 17 flows without having tailing as shown in FIG. 5D. Accordingly, transistor Q4 can easily avoid thermal runway, minimizing switching loss.

As described above, the present invention provides the transistor of the horizontal output transistor with stable base drive, to minimize switching loss and storage loss according to horizontal frequency variation. This allows the display device to operate stably.

It will be apparent to those skilled in the art that various modifications and variations can be made in the horizontal deflection drive circuit using a plurality of FETs of the present invention without departing from the spirit or scope of the invention. Thus, it is intended that the present invention cover the modifications and variations of this invention provided they come within the scope of the appended claims and their equivalents.

What is claimed is:

1. A horizontal deflection drive circuit using a plurality of FETs, comprising:

a base drive current supply for receiving an oscillation pulse in a low level generated by an oscillation element, to perform switching operation;

a P-channel FET for receiving the oscillation pulse in a low level generated by the oscillation element, and receiving current from the base drive current supply, to perform switching operation;

an N-channel FET for receiving an oscillation pulse in a high level generated by the oscillation element, to perform switching operation; and a drive transformer for inducing current supplied from a deflection current supply according to the switching operations of the P-channel FET and N-channel FET, the P-channel FET being switched by the current supplied from the base drive current supply.

2. The circuit as claimed in claim 1, wherein the base drive current supply includes a transistor which receives the oscillation pulse in a low level generated by the oscillation element, to perform switching operation.

3. The circuit as claimed in claim 1, wherein the P-channel FET includes a FET (Q2) which receives the oscillation pulse in a low level generated by the oscillation element and receives current which flows according to turning on of a transistor (Q1) of the base drive current supply, to perform switching operation.

4. The circuit as claimed in claim 1, wherein the N-channel FET includes a FET (Q3) which receives the oscillation pulse in a high level generated by the oscillation element, to perform switching operation.

5. The circuit as claimed in claim 1, wherein the drive transformer comprises:

a coil (L4) to which deflection current is supplied;

a coil (L1) for receiving energy induced by the coil (L4) according to turning on of a FET (Q2) of the P-channel FET; and coils (L2 and L3) for receiving energy induced by the coil (L1) according to turning on of a FET (Q3) of the N-channel FET.

* * * * *